United States Patent
Yang (10) Patent No.: US 7,104,646 B2
(45) Date of Patent: Sep. 12, 2006

(54) EYEGLASSES WITH ADJUSTABLE TEMPLES

(75) Inventor: Shun-Tien Yang, Yung-Kang (TW)

(73) Assignee: All-Logic Int. Co., Ltd., Yung-Kang (TW)

( * ) Notice: Subject to any disclaimer, the term of this patent is extended or adjusted under 35 U.S.C. 154(b) by 0 days.

(21) Appl. No.: 11/152,293

(22) Filed: Jun. 14, 2005

(65) Prior Publication Data

US 2006/0055875 A1    Mar. 16, 2006

(30) Foreign Application Priority Data

Aug. 26, 2004  (TW) ............................... 93213553 U (51) Int. Cl.
*G02C 5/14* (2006.01)
(52) U.S. Cl. .................. 351/120; 351/118; 351/119
(58) Field of Classification Search ............... 351/120, 351/111, 118, 119, 110, 41, 158
See application file for complete search history.

(56) References Cited

U.S. PATENT DOCUMENTS 6,776,483 B1 *   8/2004   Wu ............................. 351/120

* cited by examiner

*Primary Examiner*—Hung Xuan Dang
(74) *Attorney, Agent, or Firm*—Frommer Lawrence & Haug LLP; Ronald R. Santucci (57) ABSTRACT

A pair of eyeglasses includes a lens unit and a pair of temples. The lens unit includes two opposite temple-connecting parts, each of which has a first engaging member that is formed with first teeth. Each of the temples is respectively pivoted to the temple-connecting parts so as to be rotatable relative to the lens unit about an axis. Each of the temples has a second engaging member that is formed with second teeth which are centered about the axis and which mesh with the first teeth. One of the first and second engaging members is resilient so as to slightly deform in radial directions relative to the axis and so as to reduce the friction between the first and second teeth up on pivoting movement of the temples about the axis.

7 Claims, 8 Drawing Sheets

EYEGLASSES WITH ADJUSTABLE TEMPLES

CROSS-REFERENCE TO RELATED APPLICATION

This application claims priority of Taiwanese Application No. 093213553, filed on Aug. 26, 2004.

BACKGROUND OF THE INVENTION

1. Field of the Invention

The invention relates to a pair of eyeglasses, more particularly to a pair of eyeglasses with adjustable temples.

2. Description of the Related Art

Figure 1:
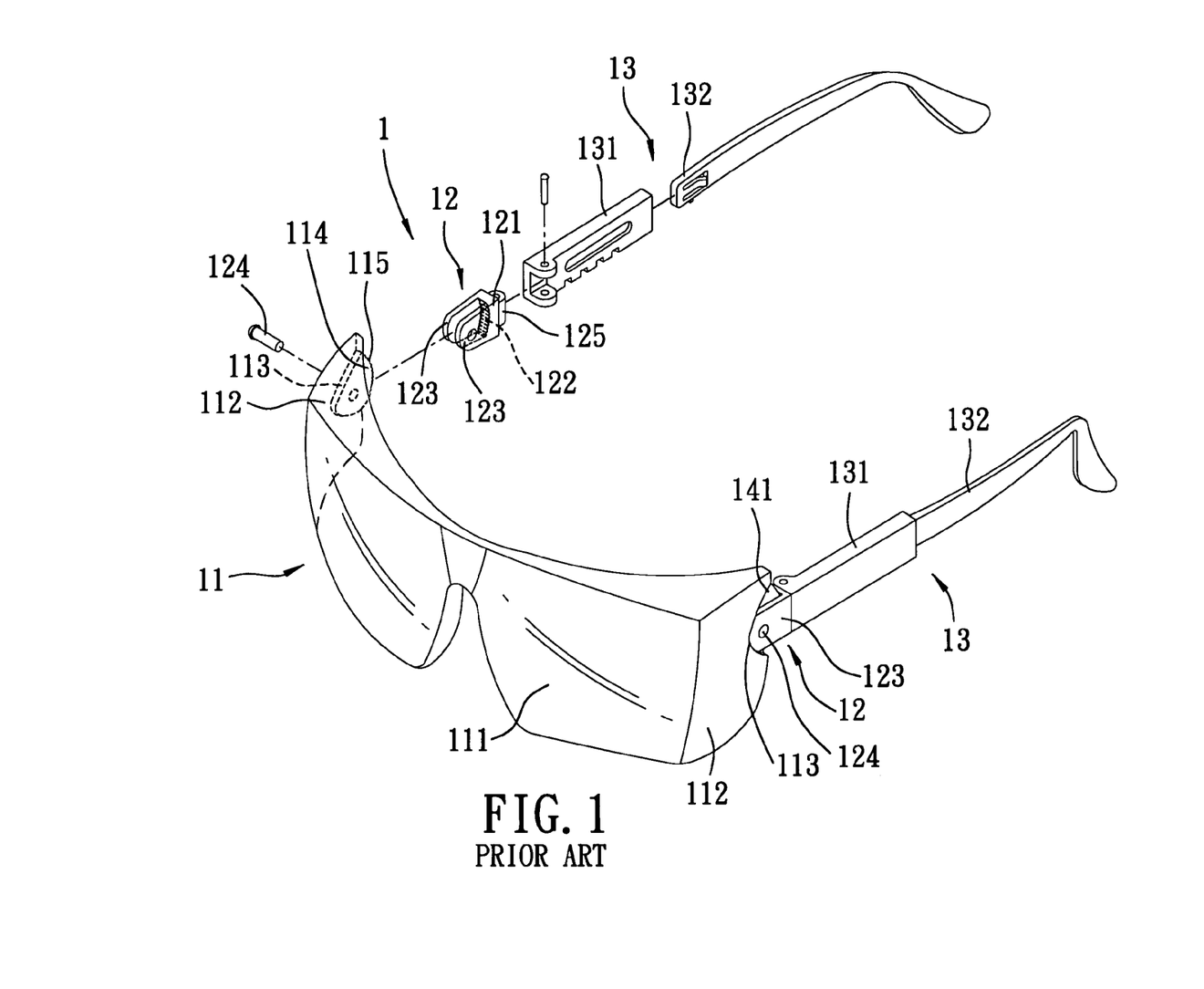
FIG. 1 is a partly exploded perspective view of a conventional eyeglasses with adjustable temples.
Figure 2:
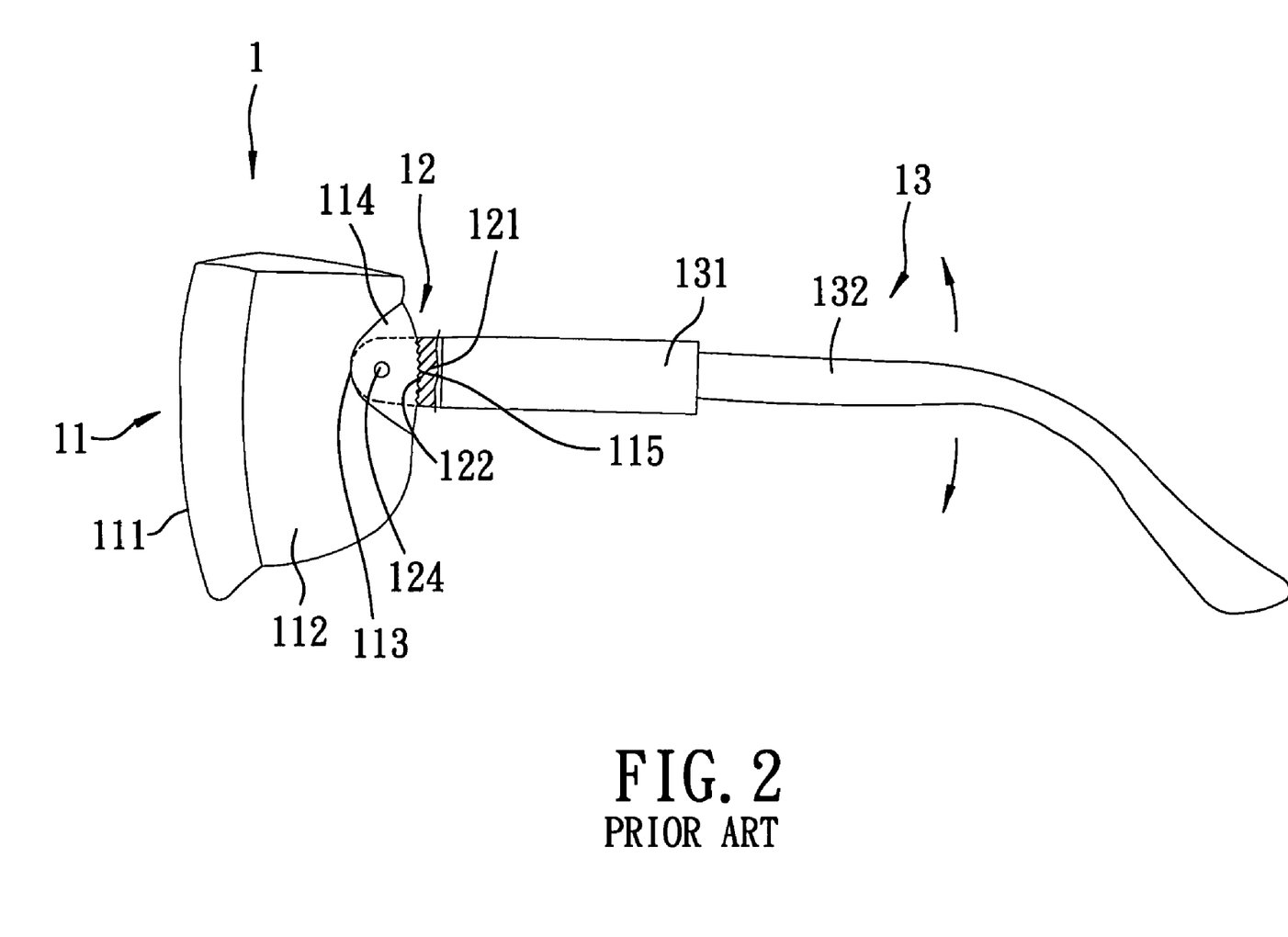
FIG. 2 is a schematic cutaway view of the conventional eyeglasses with adjustable temples.

As shown in FIGS. 1 and 2, a pair of conventional eyeglasses 1 includes a lens unit 11, a pair of temple-adjusting seats 12, and a pair of temples 13. The lens unit 11 includes a lens 111, two opposite temple-connecting parts 112 integrally connected to opposite lateral sides of the lens 111 and having arcuate rear edges 113, and two fan-shaped protruding first engaging members 114 that respectively extend from the rear edges 113 of the temple-connecting parts 112 and that are respectively formed with first teeth 115.

Each of the temple-adjusting seats 12 is pivotably connected to a respective one of the first engaging members 114, and extends rearwardly. Each of the temple-adjusting seats 12 includes a base block 121 having a rear surface and a front surface formed with second teeth 122 that mesh with the first teeth 115, a pair of pivot connecting arms 123 extending frontwardly from two lateral sides of the base block 121, a pivot axle 124 for pivotably connecting the pivot connecting arms 123 to the respective second engaging member 114, and a protruding block 125 extending from the rear surface of the base block 121.

Each of the temples 13 includes a connecting seat 131 for pivotably connecting to the protruding block 125 of a respective temple-adjusting seat 12, and a length-adjustable extension rod 132 extendable in the connecting seat 131. Since the structure and mechanism of length adjustment are well known to those skilled in the art, further details thereof are dispensed withherein.

To adjust the angle of the temples 13 relative to the lens unit 11, either of the temples 13 or the lens unit 11 is operated so as to pivot the temples 13 in conjunction with the temple-adjusting seats 12 about the pivot axle 124. The temples 13 are subsequently positioned through meshing of the first teeth 115 with the second teeth 122.

Although the aforesaid eyeglasses 1 permits adjustment of angles of the temples 13 relative to the lens unit 11, there are still several drawbacks in use. In particular, since the first engaging member 114 and the base block 121 are relatively rigid, friction between the first and second teeth 115, 122 is relatively large. As a consequence, adjustment of the temples 13 relative to the lens unit 11 is relatively rough and inconvenient, and wearing of the first engaging member 114 and the base block 121 is relatively severe.

SUMMARY OF THE INVENTION

Therefore, the object of the present invention is to provide a pair of eyeglasses that can overcome the aforesaid drawbacks associated with the prior art.

Accordingly, a pair of eyeglasses of this invention comprises a lens unit and a pair of temples. The lens unit includes two opposite temple-connecting parts, each of which has a first engaging member that is formed with first teeth. Each of the temples is respectively pivoted to the temple-connecting parts so as to be rotatable relative to the lens unit about an axis. Each of the temples has a second engaging member that is formed with second teeth which are centered about the axis and which mesh with the first teeth. One of the first and second engaging members is resilient so as to slightly deform in radial directions relative to the axis and so as to reduce the friction between the first and second teeth upon pivoting movement of the temples about the axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
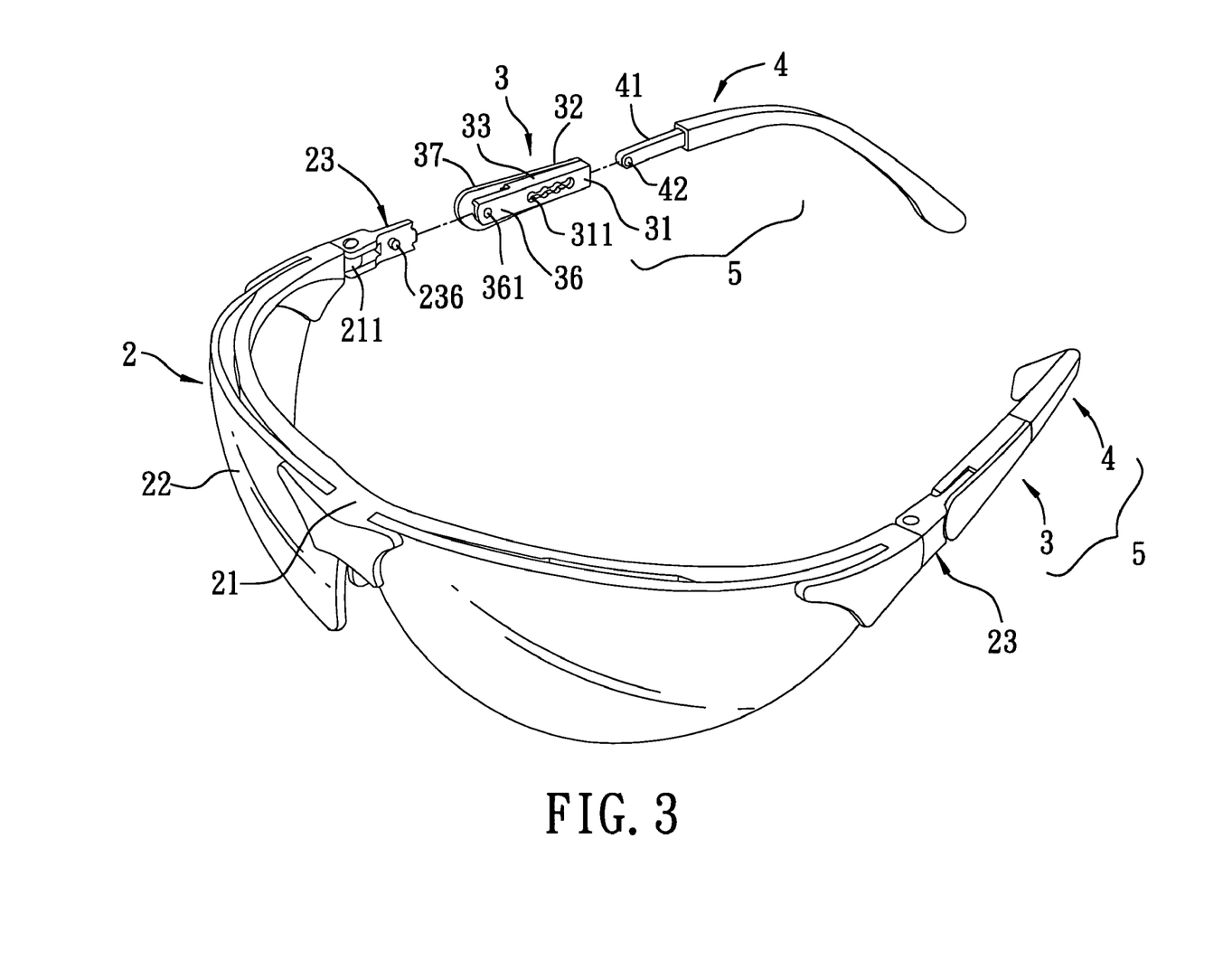
FIG. 3 is a partly exploded, perspective view of the preferred embodiment of a pair of eyeglasses with adjustable temples according to this invention.
Figure 4:
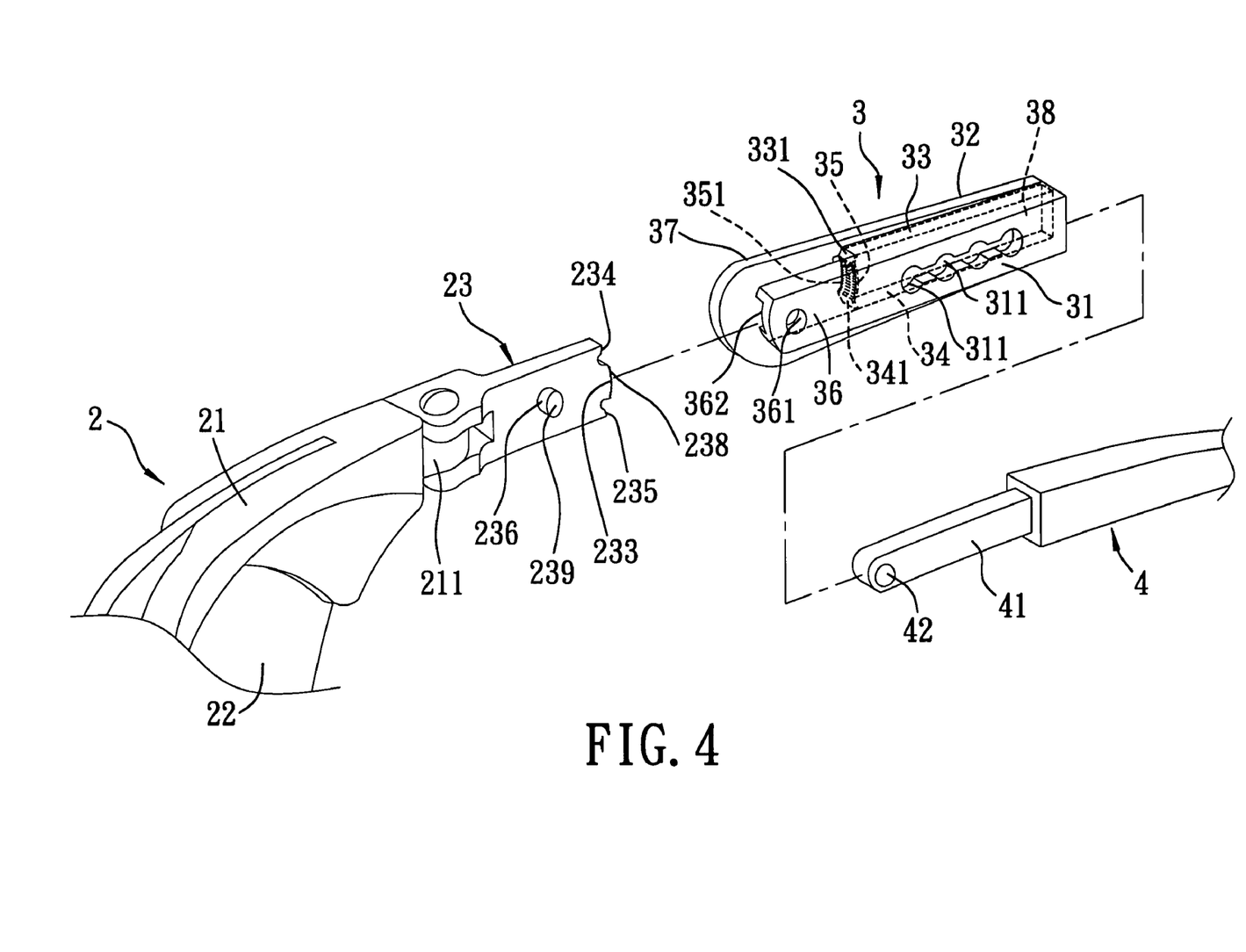
FIG. 4 is a fragmentary exploded perspective view of the preferred embodiment.

Referring to FIGS. 3 and 4, the preferred embodiment of a pair of eyeglasses according to the present invention is shown to include a lens unit 2, and a pair of temples 5.

The lens unit 2 includes a frame 21 extending in an elongated direction and having opposite edges 211, a lens 22 embedded beneath the frame 21 and two opposite temple-connecting parts 23, each of which is connected to a respective one of the edges 211 of the frame 21, and each of which has a first engaging member 233 that is formed with first teeth 238.

In actual design, the frame 21 and the lens 22 may be integrally formed, or the frame 21 may embrace the lens 22 it its entirety. The temple-connecting parts 23 may also be integrally formed with the frame 21, as long as they extend rearwardly relative to the frame 21.

The temples 5 are respectively pivoted to the temple-connecting parts 23 so as to be rotatable relative to the lens unit 2 about an axis. Each of the temples 5 has a second engaging member 35 that is formed with second teeth 351 which are centered about the axis and which mesh with the first teeth 238.

One of the first and second engaging members 233, 35 is resilient so as to slightly deform in radial directions relative to the axis and so as to reduce friction between the first and second teeth 238, 351 upon pivoting movement of the temples 5 about the axis. In this embodiment, only the second engaging members 35 are resilient.

Figure 5:
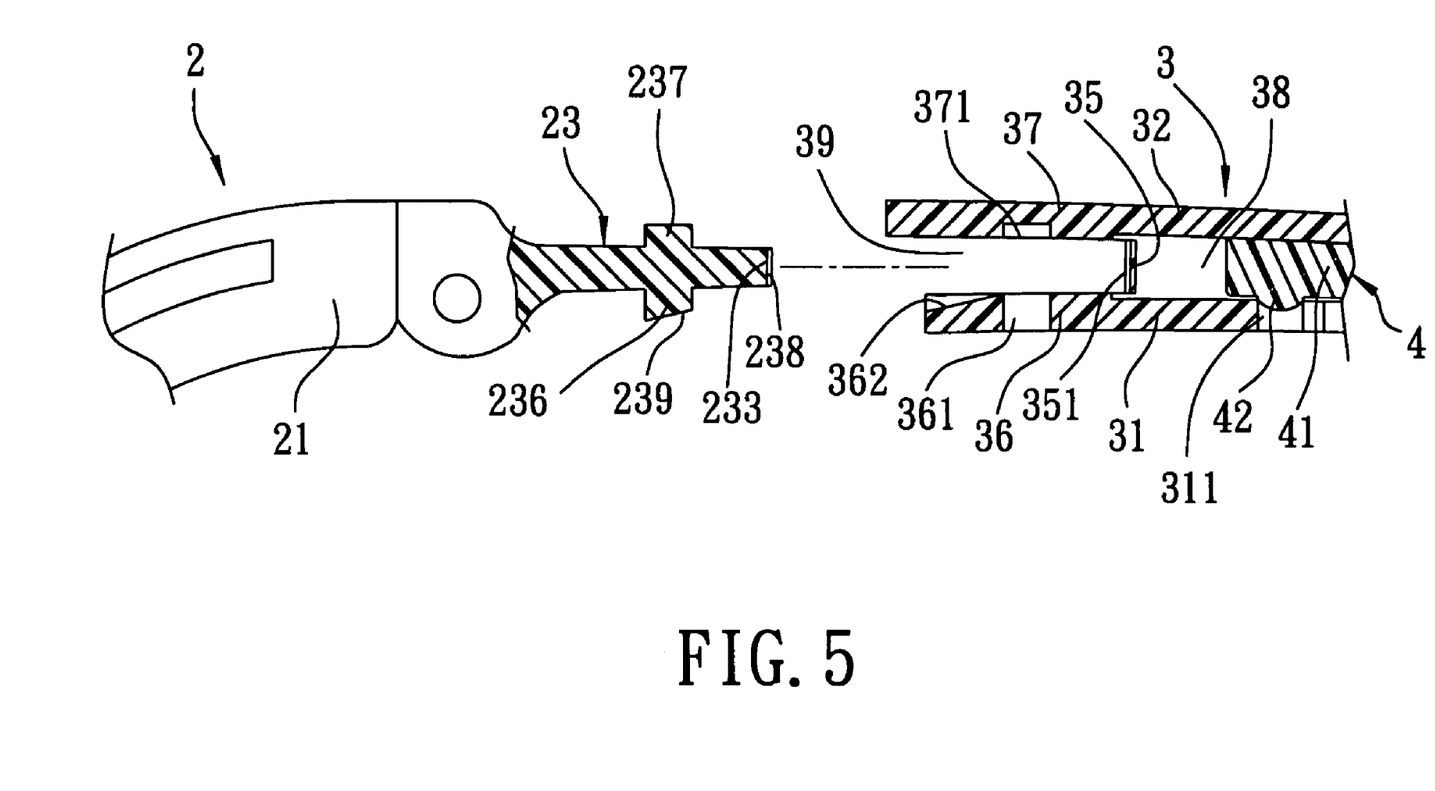
FIG. 5 is a fragmentary, exploded, partly sectional, schematic top view of the preferred embodiment.
Figure 6:
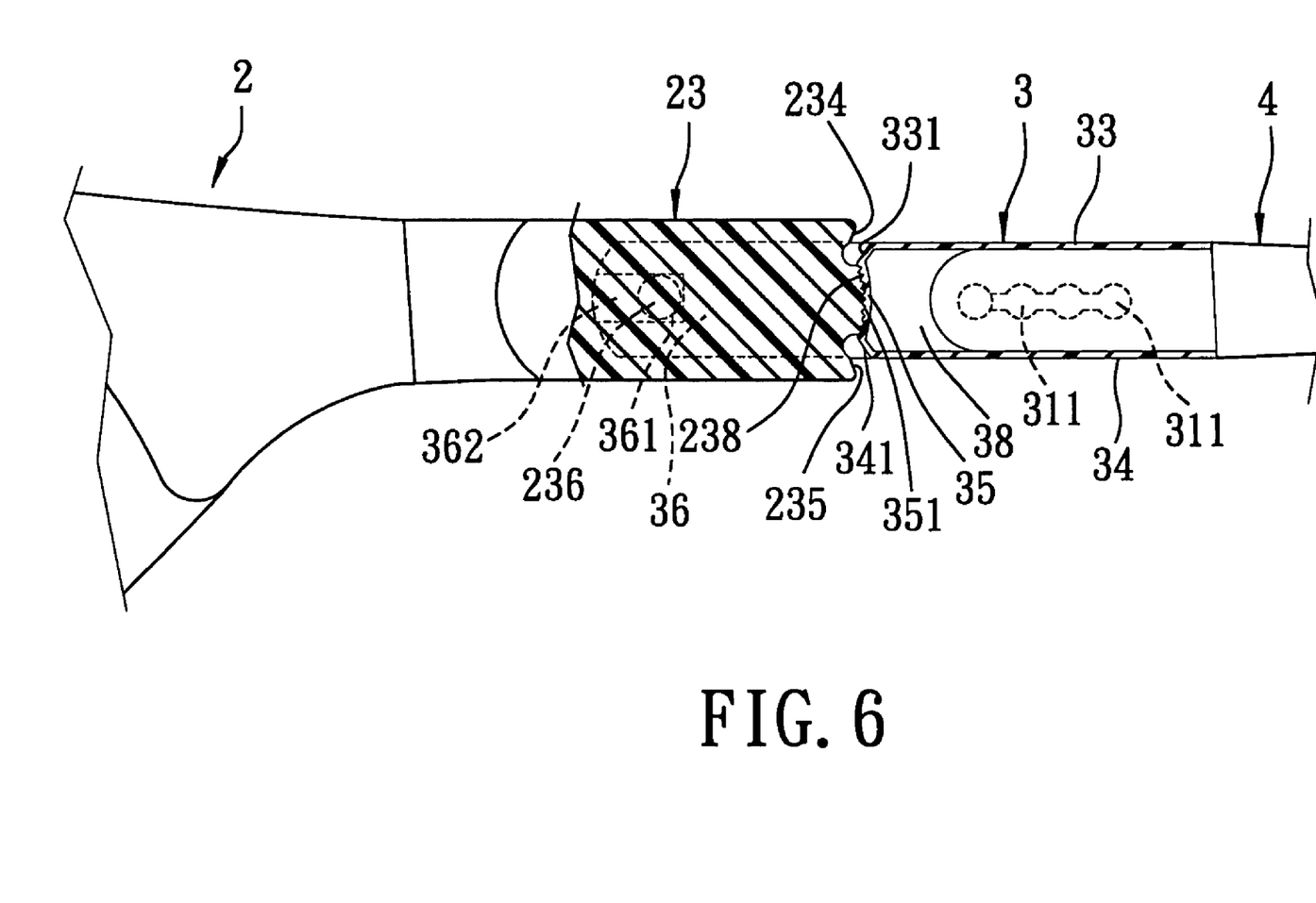
FIG. 6 is a fragmentary partly sectional, schematic side view of the preferred embodiment.
Figure 7:
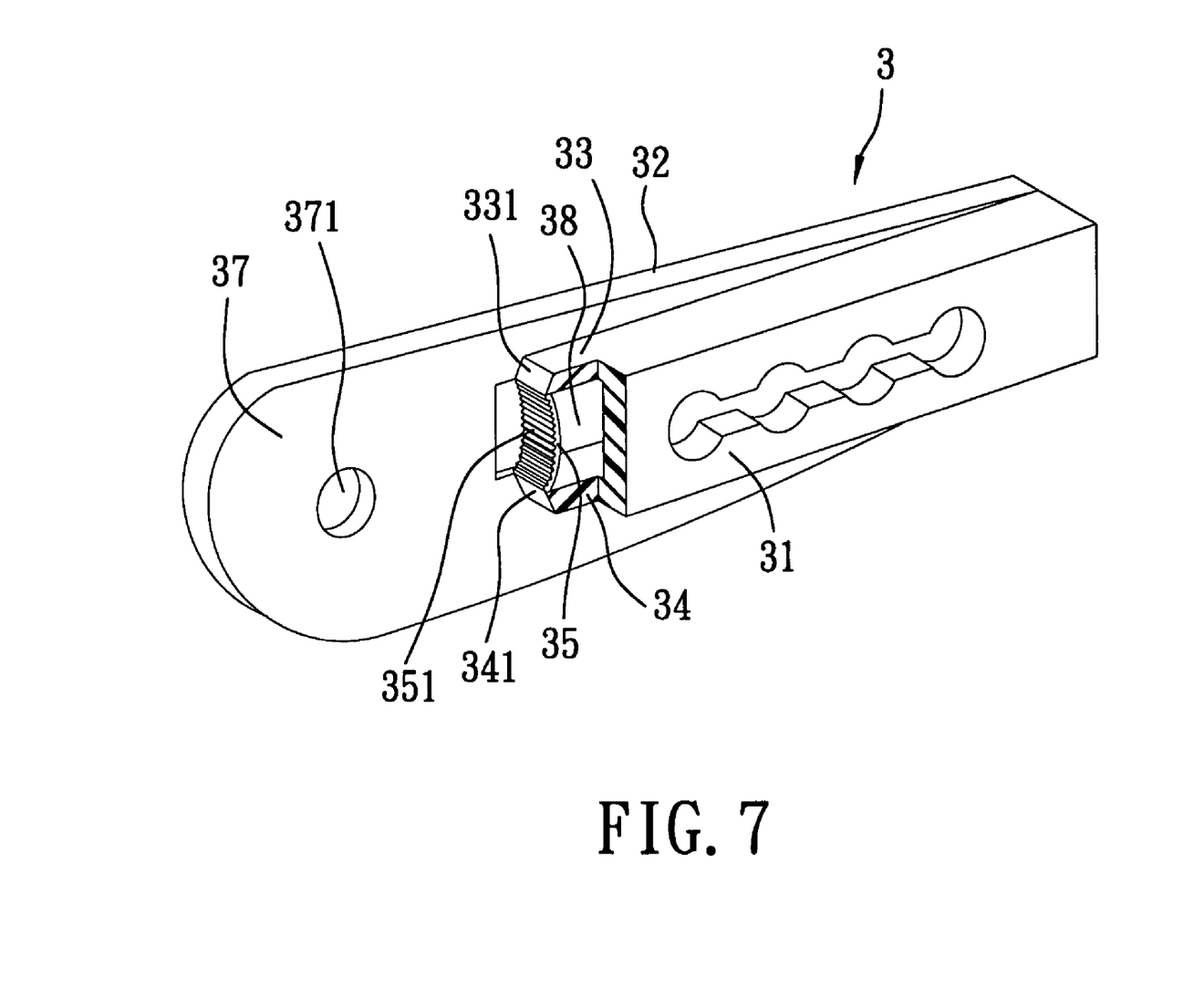
FIG. 7 is a fragmentary perspective view of the preferred embodiment with an inner connecting wall removed for clarity.

Referring to FIGS. 4, 5, and 6, each of the temples 5 further has a connecting seat 3 that is integrally made of plastic, and that has two opposite inner and outer mounting walls 31, 32 spaced apart from each other, and two opposite upper and lower connecting walls 33, 34 spaced apart from each other and interconnecting the mounting walls 31, 32. Each of the temple-connecting parts 23 is pivoted to the mounting walls 31, 32 of the respective one of the temples 5. Each of the connecting walls 33, 34 has a front end. The second engaging member 35 interconnects the front ends of the connecting walls 33, 34, is spaced apart from the mounting walls 31, 32, and is resiliently and slightly deformable relative to the connecting walls 33, 34. In this embodiment, the second engaging member 35 is in the form of a thin arcuate plate (see FIG. 7) that has a thickness ranging from 0.4 mm to 2.5 mm.

Referring again to FIG. 5, the mounting walls 31, 32 respectively have front end portions 36, 37 that extend frontwardly from the front ends of the connecting walls 33, 34 and that cooperate with the front ends of the connecting walls 33, 34 to define a recess 39 thereamong. The first engaging member 233 extends into the recess 39, and has an arcuate rear end that is formed with the first teeth 238.

For pivot connection between the temples 5 and the temple-connecting parts 23, the front end portions 36, 37 of the inner and outer mounting walls 31, 32 are respectively formed with two opposite inner and outer holes 361, 371, wherein the hole 361 is a through hole whereas the hole 371 is a blind hole. The first engaging member 233 is formed with two opposite inner and outer studs 236, 237 that respectively extend into the holes 361, 371 in the mounting walls 31, 32 so as to permit pivoting movement of the temples 5 relative to the lens unit 2.

For ease of pivot connection, the inner stud 236 has a slant end face 239 that is oblique relative to the radial directions, and the front end portion 36 of the inner mounting wall 31 has a slant inner face 362 that is oblique relative to the radial directions and that complements with the slant end face 239 of the inner stud 236 so as to facilitate alignment of the first and second engaging members 233, 35 and insertion of the first engaging member 233 into the recess 39.

Figure 8:
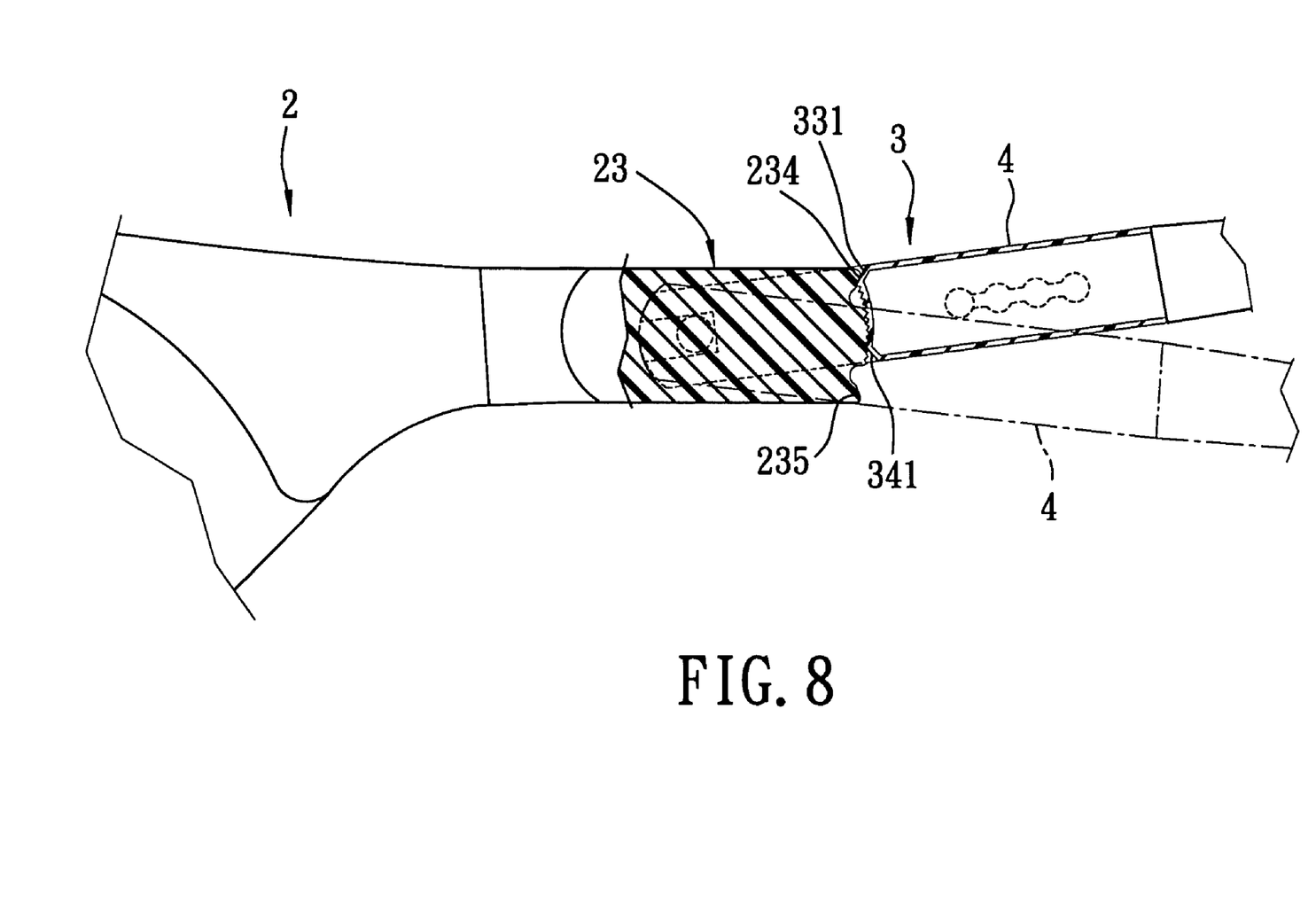
FIG. 8 is a fragmentary cutaway view to illustrate adjustment of the preferred embodiment.

To limit angle adjustment of the temples 5, the rear end of the first engaging member 233 is further formed with upper and lower protrusions 234, 235. The first teeth 238 are disposed between the upper and lower protrusions 234, 235. The front ends of the upper and lower connecting walls 33, 34 respectively have slant faces 331, 341 that are oblique relative to the radial directions. The second engaging member 35 is disposed between the slant faces 331, 341 of the front ends of the connecting walls 33, 34. In this manner, each of the temples 5 is rotatable relative to the lens unit 2 between an upper angular position, where the upper protrusion 234 abuts against the upper slant face 331, and a lower angular position, where the lower protrusion 235 abuts against the lower slant face 341, as best shown in FIG. 8. It should be noted herein that the angle-limiting structures of the connecting seats 3 and the temple-connecting parts 23 can be switched.

Referring again to FIGS. 3 and 4, each of the temples 5 further has an extension rod 4 disposed rearwardly of the second engaging member 35. The mounting walls 31, 32 cooperate with the connecting walls 33, 34 to define an accommodation space 38 thereamong for extension of the extension rod 4 therein. Moreover, the inner mounting walls 31 is formed with a series of holes 311, whereas the extension rod 4 is formed with a tongue 42 that extends into a selected one of the holes 311 in the inner mounting wall 31 for length adjustment of the extension rod 4. Since the length adjustment and positioning of the extension rods 4 are not the main point of this invention, further details are omitted herein. It should be noted that, in an alternative design, the extension rods 4 may be fixedly mounted to the connecting seats 3 for simplicity.

During assembly, each of the temple-connecting parts 23 is inserted into the recess 39 between the front end portions 36, 37 of the mounting walls 31, 32. During insertion, the inner stud 236 abuts against the slant inner face 362 and pushes the front end portion 36 of the inner mounting wall 31 to bend outwardly relative to the temple-connecting part 23 until the studs 236, 237 extend into the holes 361, 371, respectively. At this time, the connecting seat 3 is coupled firmly to the lens unit 2, and the first teeth 238 mesh the second teeth 351.

To adjust the angle of the extension rods 4 relative to the lens unit 2, the lens unit 2 is first held still, and the extension rods 4 are subsequently forced to pivot upward or downward.

In sum, by virtue of the resiliency of the second engaging members 35 of the temples 35, the first and second teeth 238, 351 are able to mesh more easily and smoothly during pivoting movement of the temples 5 realtive to the lens unit 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A pair of eyeglasses comprising:
a lens unit including two opposite temple-connecting parts, each of which has a first engaging member that is formed with first teeth; and
a pair of temples respectively pivoted to said temple-connecting parts so as to be rotatable relative to said lens unit about an axis, each of said temples having a second engaging member that is formed with second teeth which are centered about said axis and which mesh with said first teeth;
wherein one of said first and second engaging members is resilient so as to slightly deform in radial directions relative to said axis and so as to reduce friction between said first and second teeth upon pivoting movement of said temples about said axis,
wherein each of said temples further has a connecting seat that has two opposite mounting walls spaced apart from each other, and two opposite connecting walls spaced apart from each other and interconnecting said mounting walls, each of said temple-connecting parts being pivoted to said mounting walls of the respective one of said temples, each of said connecting walls having a front end, said second engaging member interconnecting said front ends of said connecting walls, being spaced apart from at least one of said mounting walls, and being resiliently and slightly deformable relative to said connecting walls.

2. The eyeglasses as claimed in claim 1, wherein said second engaging member is in the form of a thin arcuate plate that has a thickness ranging from 0.4 mm to 2.5 mm.

3. The eyeglasses as claimed in claim 1, wherein said mounting walls respectively have front end portions that extend frontwardly from said front ends of said connecting walls and that cooperate with said front ends of said connecting walls to define a recess thereamong, said first engaging member extending into said recess and having an arcuate rear end that is formed with said first teeth.

4. The eyeglasses as claimed in claim 3, wherein each of said mounting walls is formed with two opposite holes, said first engaging member being formed with two opposite studs that respectively extend into said holes in said mounting walls so as to permit pivoting movement of said temples relative to said lens unit.

5. The eyeglasses as claimed in claim 4, wherein one of said studs has a slant end face that is oblique relative to said radial directions, said front end portion of one of said mounting walls having a slant inner face that is oblique relative to said radial directions and that complements with said slant end face of said one of said studs so as to facilitate alignment of said first and second engaging members and insertion of said first engaging member into said recess.

6. The eyeglasses as claimed in claim 3, wherein said rear end of said first engaging member is formed with upper and lower protrusions, said first teeth being disposed between said upper and lower protrusions, said front ends of said connecting walls having respectively slant faces that are oblique relative to said radial directions, said second engaging member being disposed between said slant faces of said front ends of said connecting walls, each of said temples being rotatable relative to said lens unit between upper and lower angular positions, said upper protrusion abutting against a respective one of said slant faces when a respective one of said temples is disposed at said upper angular position, said lower protrusion abutting against the other of said slant faces when the respective one of said temples is disposed at said lower angular position.

7. The eyeglasses as claimed in claim 1, wherein each of said temples further has an extension rod disposed rearwardly of said second engaging member, said mounting walls cooperating with said connecting walls to define an accommodation space thereamong for extension of said extension rod therein, one of said mounting walls being formed with a series of holes, said extension rod being formed with a tongue that extends into a selected one of said holes in said one of said mounting walls.

* * * * *